US012808796B2

(12) United States Patent
Gunther et al.

(10) Patent No.: US 12,808,796 B2
(45) Date of Patent: Nov. 24, 2026

(54) SYSTEM AND METHOD FOR MEASURING BIDIRECTIONAL REFLECTANCE DISTRIBUTION FUNCTION

(71) Applicant: The Boeing Company, Arlington, VA (US)

(72) Inventors: Brian Gunther, St. Louis, MO (US); Jeffery T. Murphy, Troy, MO (US)

(73) Assignee: The Boeing Company, Arlington, VA (US)

( * ) Notice: Subject to any disclaimer, the term of this patent is extended or adjusted under 35 U.S.C. 154(b) by 74 days.

(21) Appl. No.: 18/792,832

(22) Filed: Aug. 2, 2024

(65) Prior Publication Data

US 2026/0036516 A1 Feb. 5, 2026

(51) Int. Cl.
*G01N 21/47* (2006.01)
*G01N 21/01* (2006.01)

(52) U.S. Cl.
CPC ......... *G01N 21/4738* (2013.01); *G01N 21/01* (2013.01); *G01N 2021/4711* (2013.01); *G01N 2201/0637* (2013.01); *G01N 2201/0638* (2013.01); *G01N 2201/0668* (2013.01); *G01N 2201/0683* (2013.01)

(58) Field of Classification Search
CPC .... G01N 21/4738; G01N 21/01; G01N 21/55; G01N 2021/4711; G01N 2201/0637; G01N 2201/0638; G01N 2201/0668; G01N 2201/0683
See application file for complete search history.

(56) References Cited

U.S. PATENT DOCUMENTS

| | | | | |
|---|---|---|---|---|
| 6,483,590 | B1 * | 11/2002 | Davis | G01N 21/474 356/600 |
| 11,002,666 | B2 * | 5/2021 | Fauconier | G01N 21/55 |
| 2003/0133121 | A1 * | 7/2003 | Davis | G01N 21/55 356/445 |

(Continued)

FOREIGN PATENT DOCUMENTS

| | | | | |
|---|---|---|---|---|
| CN | 102539122 A | * | 7/2012 | |
| CN | 116754519 A | * | 9/2023 | G01N 21/47 |

OTHER PUBLICATIONS

CN 102539122 A, translation (Year: 2012).*

*Primary Examiner* — Tarifur R Chowdhury
*Assistant Examiner* — Carlos Perez-Guzman
(74) *Attorney, Agent, or Firm* — Alleman Hall LLP

(57) ABSTRACT

A system for measuring a bidirectional reflectance distribution function (BRDF). The system includes a light source configured to generate light beams, a series of reflective elements and a two-axis mirror configured to direct the light beams. A beam splitter configured to allow allows a first portion of the light beams to pass therethrough. An ellipsoidal mirror is configured to receive the first portion of light beams at multiple predetermined locations on the ellipsoidal mirror as directed by the two-axis mirror with the two-axis mirror being located at a second focal point of the ellipsoidal mirror. The ellipsoidal mirror is configured to direct the first portion of light beams through a first focal point to reflect off a sample and generate reflected light beams. The reflected light beams are directed to the beam splitter and through a third focal point before being received by a first detector.

20 Claims, 4 Drawing Sheets

(56) References Cited

U.S. PATENT DOCUMENTS

| | | | | |
|---|---|---|---|---|
| 2016/0054221 | A1* | 2/2016 | Wilcken | G01N 21/55 356/446 |
| 2016/0252451 | A1* | 9/2016 | Kawate | G02B 17/0657 359/858 |

* cited by examiner

SYSTEM AND METHOD FOR MEASURING BIDIRECTIONAL REFLECTANCE DISTRIBUTION FUNCTION

FIELD

The present disclosure relates to the field of optics, and in particular, to a system for measuring a bidirectional reflectance distribution function.

BACKGROUND

Bidirectional reflectance distribution function gives the reflectance of a target as a function of illumination geometry and viewing geometry. The bidirectional reflectance distribution function depends on wavelength and is determined by the structural and optical properties of the surface. Optical and structural properties may include shadow-casting, multiple scattering, mutual shadowing, transmission, reflection, absorption and emission by surface elements, facet orientation distribution and facet density.

DESCRIPTION OF THE DRAWINGS

Some embodiments of the present disclosure are now described, by way of example only, and with reference to the accompanying drawings. The same reference number represents the same element or the same type of element on all drawings.

SUMMARY

Figure 1:
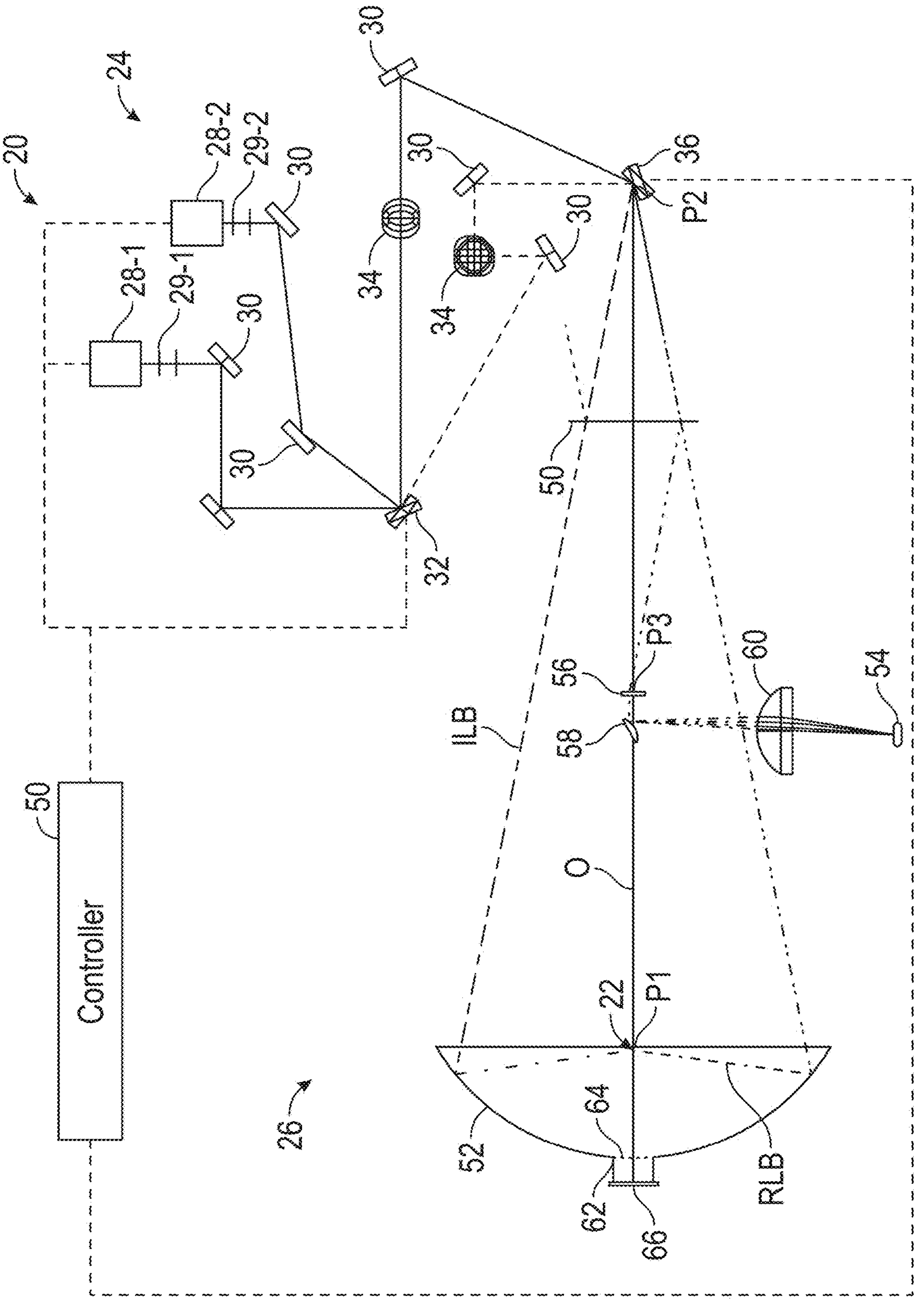
FIG. 1 is a schematic illustration of a system for measuring a bidirectional reflectance distribution function (herein after "BRDF") of a sample having a generation portion and a detection portion according to an exemplary embodiment.

Disclosed herein is a system for measuring a bidirectional reflectance distribution function. The system includes a light source configured to generate light beams, a series of reflective elements configured to direct the light beams, and a two-axis mirror configured to direct the light beams from the series of reflective elements. A beam splitter is configured to receive the light beams from the two-axis mirror and allow a first portion of the light beams to pass through the beam splitter. An ellipsoidal mirror is configured to receive the first portion of light beams from the beam splitter at a multitude of predetermined locations on the ellipsoidal mirror as directed by the two-axis mirror with the two-axis mirror being located at a second focal point of the ellipsoidal mirror. The ellipsoidal mirror is also configured to direct the first portion of light beams through a first focal point of the ellipsoidal mirror to reflect off a sample at the first focal point to generate reflected light beams with the reflected light beams are directed from the ellipsoidal mirror to the beam splitter with a portion of the reflected light beams configured to reflect off the beam splitter and pass through a third focal point. The system also includes a first detector configured to receive the reflected light beams from the third focal point for each of the multitude of predetermined locations for measuring the bidirectional reflectance distribution function.

In another aspect of the disclosure a location of the light source is fixed relative to a location of the first detector when the two-axis mirror directs the light beams to each of the multitude of predetermined locations on the ellipsoidal mirror.

In another aspect of the disclosure the first focal point of the ellipsoidal mirror and the second focal point are located along an optical axis of the ellipsoidal mirror.

In another aspect of the disclosure the first detector is located along an optical axis of the ellipsoidal mirror.

In another aspect of the disclosure the system includes a lens located one focal length away from the third focal point aligned along the optical axis of the ellipsoidal mirror.

In another aspect of the disclosure the system includes a reflector located along the optical axis for directing the reflected light beams from the lens in a direction transverse to the optical axis.

In another aspect of the disclosure the system includes a second lens configured to receive the reflected light beams from the reflected and direct them to the first detector.

In another aspect of the disclosure the system includes a second detector located on an opposite side of the ellipsoidal mirror from the first focal point of the ellipsoidal mirror.

In another aspect of the disclosure the system includes a collimating lens located between the first focal point of the ellipsoidal mirror and the second detector.

In another aspect of the disclosure the first detector is a spatially resolved detector.

In another aspect of the disclosure the series of reflective elements include a galvanometer for selectively directing the light beams through one of a first polarizer or a second polarizer.

Disclosed herein is a method of measuring a bidirectional reflectance distribution function. The method includes generating light beams with a light source and directing the light beams from light source with a series of reflectors to a two-axis mirror. The two-axis mirror directs the light beams to a multitude of predetermined locations on an ellipsoidal mirror and the light beams reflect off a sample located at a first focal point of the ellipsoidal mirror to generate reflected light beams with the two-axis mirror. The method also includes collecting the reflected light beams corresponding to each of the multitude of predetermined locations on the ellipsoidal mirror with a first detector with a portion of the reflected light beams reflecting off a beam splitter and passing through a third focal point prior to reaching the first detector for measuring a bidirectional reflectance distribution function.

In another aspect of the disclosure the reflected light beams pass through a lens at the third focal point, wherein the lens is aligned along an optical axis of the ellipsoidal mirror.

In another aspect of the disclosure the method includes directing the light beams from the lens at the third focal point in a direction transverse to the optical axis of with a reflector to the first detector.

In another aspect of the disclosure the series of reflective elements include a galvanometer for selectively directing the light beams through one of a first polarizer or a second polarizer.

In another aspect of the disclosure the method includes collecting the reflected light beams with a second detector when an angle of incidence between the light beams and the ellipsoidal mirror is below a predetermined threshold angle.

In another aspect of the disclosure the second detector is aligned with an opening in the ellipsoidal mirror and the second detector is located on an opposite side of the ellipsoidal mirror from the first focal point of the ellipsoidal mirror.

In another aspect of the disclosure the reflected light beams pass through a collimating lens located between the first focal point of the ellipsoidal mirror and the second detector.

Disclosed herein is a non-transitory computer-readable storage medium embodying programmed instructions which, when executed by a processor, are operable for performing a method. The method includes generating light beams with a light source and directing the light beams from light source with a series of reflectors to a two-axis mirror. The two-axis mirror directs the light beams to a multitude of predetermined locations on an ellipsoidal mirror and the light beams reflect off a sample located at a first focal point of the ellipsoidal mirror to generate reflected light beams with the two-axis mirror. The method also includes collecting the reflected light beams corresponding to each of the multitude of predetermined locations on the ellipsoidal mirror with a first detector with a portion of the reflected light beams reflecting off a beam splitter and passing through a third focal point prior to reaching the first detector for measuring a bidirectional reflectance distribution function.

In another aspect of the disclosure the method includes collecting the reflected light beams with a second detector when an angle of incidence between the light beams and the ellipsoidal mirror is below a predetermined threshold angle.

DESCRIPTION

Embodiments of the present disclosure are described herein. It is to be understood, however, that the disclosed embodiments are illustrative examples, and that other embodiments can take various and alternative forms. The Figures are not necessarily drawn to scale and may be schematic. Some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the drawings wherein like reference numbers refer to the same or like components in the several Figures and beginning with FIG. 1, a system 20 for measuring BRDF of a sample 22 in an exemplary embodiment. The system 20 includes a generation portion 24 for generating light beams and directing the light beams into a detection portion 26 for measuring the BRDF of the sample 22.

In the illustrated example, the generation portion 24 includes at least one light source, such as a first laser 28-1 and a second laser 28-2, which generates light beams that travel through the system 20 as will be described in greater detail below. The light beams from the first and second lasers 28-1 and 28-2 travel through laser specific collimation optics 29-1 and 29-2, respectively, to collimate the light beams prior to being directed through a series of reflective elements. One feature of this disclosure is that it allows for the use of multiple light sources each capable of generating different wavelengths of electromagnetic radiation for obtaining measurements of the sample 22. In one example, the reflective elements can include one or more of a fixed reflectors 30, a galvanometer 32, a periscope 34, or a two-axis mirror 36.

As shown in FIG. 1, the galvanometer 32 receives light beams from one of the first or second lasers 28-1 or 28-2 and selectively directs the light beams to one of the periscopes 34. In one example, the periscopes 34 are polarizing periscopes that polarize the light beams traveling through them prior to being directed by one of the reflectors 30 to the two-axis mirror 36. One feature of having two periscopes that are polarizers is the ability to direct different types of polarized light to the sample 22 when measuring BRDF A controller 48 is in communication with the first and second lasers 28-1 and 28-2, the galvanometer 32, and the two-axis mirror 36 to control the wavelength, polarization and angle of incidence and clocking orientation onto the sample. Any of the various control elements (e.g., electrical, or electronic components) shown in the figures or described herein may be implemented as hardware, a processor implementing software, a processor implementing firmware, or some combination of these. For example, an element may be implemented as dedicated hardware. Dedicated hardware elements may be referred to as “processors”, “controllers”, or some similar terminology. When provided by a processor, the functions may be provided by a single dedicated processor, by a single shared processor, or by a plurality of individual processors, some of which may be shared. Moreover, explicit use of the term “processor” or “controller” should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-transitory computer readable medium, non-volatile storage, logic, or some other physical hardware component or module.

As shown in FIG. 1, the detection portion 26 receives the light beams from the generation portion 24. The light beams are directed into the detection portion 26 with the two-axis mirror 36. One feature of the ellipsoidal mirror 52 is that it includes a first focal point P1 at the location of the sample 22 and a second focal point P2 at the location of the two-axis mirror 36. As discussed in greater detail below, the beam splitter 50 in connection with the ellipsoidal mirror 52 creates a third focal point P3 located along an optical axis O between the first and second focal points P1 and P2.

As the light beams entering the detection portion 26 pass through a beam splitter 50, a first portion of the light beams pass through the beam splitter 50 as input light beams ILB and a second portion of the light beams are reflected off the beam splitter 50. The second portion of the light beams are not utilized for measuring BRDF. The input light beams ILB then travel to the ellipsoidal mirror 52. Because the two-axis mirror 36 is used to direct the input light beams ILB into the ellipsoidal mirror 52, the input light beams ILB can sweep through a plurality of predetermined points or locations on the ellipsoidal mirror 52 for measuring BRDF. For example, the two-axis mirror 36 can sweep circumferentially around the sample 22 at varying angles of incidence with the sample 22 for obtaining the measurements BRDF.

As the input light beams ILB are directed along the ellipsoidal mirror 52 by the two-axis mirror 36, reflected light beams RLB reflect off the sample 22 and are received by a detector 54, such as a spatially resolved detector. In the illustrated example, as the reflected light beams RLB reflect off the sample 22, they then reflect off an opposite side of the ellipsoidal mirror 52 from the input light beams ILB. The reflected light beams RLB are then directed to the beam splitter 50. A first portion of the reflected light beams RLB pass through the beam splitter 50 and a second portion of the reflected light beams RLB reflect off the beam splitter 50. The second portion of the reflected light beams RLB then pass through the third focal point P3. In the illustrated example, the third focal point P3 is located at a point of intersection of the reflected light beams RLB and the optical axis O. One feature of utilizing the beam splitter 50 in connection with the ellipsoidal mirror 52 is the formation of the third focal point P3 such that the detection portion 26 includes three focal points.

In the illustrated example, a lens 56 is located one focal length away from point P3. The lens 56 focuses the light beams at the third focal point P3 to a reflector 58, such as a mirror. In the illustrated example, the lens 56 is aligned along optical axis O with the optical axis O passing through a center point of the ellipsoidal mirror 52 and the sample 22. From the reflector 58, the reflected light beams RLB then travel transverse to the optical axis O to a detector input lens 60 that directs the reflected light beams RLB to the detector 54. One feature of the system 20 is that it allows for BRDF to be measured without repositioning one of the first or second lasers 28-1 or 28-2 relative to the sample 22 or the detector 54.

Furthermore, a second detector 66, such as a spatially resolved detector, can capture the BRDF measurements that would otherwise be blocked from the detector 54 by the sample 22. In the illustrated example, the second detector 66 is located on an opposite side of the ellipsoidal mirror 52 from the sample 22. The second detector 66 is also aligned with an opening 62 in the ellipsoidal mirror 52 and positioned along the optical axis O. A collimating lens 64 is located along the optical axis O for collecting the reflected light beams RLB off the sample 22 and directing them into the second detector 66.

During operation of the system 20 to collect measurements for the BRDF, the controller 48 receives input signals from one of the detectors 54 or 66 for each of the plurality of predetermined locations along the ellipsoidal mirror 52 as determined by directing the two-axis mirror 36. The input signals may be pre-amplified, filtered with a low-pass filter, Analog-to-Digital (A/D) converted, and stored in memory on the controller 48 such that each of the input measurements are associated with an intensity of the reflected light beams RLB at a given circumferential position and angle of incidence relative to a location of the input light beams ILB reflecting off the ellipsoidal mirror 52.

Figure 2:
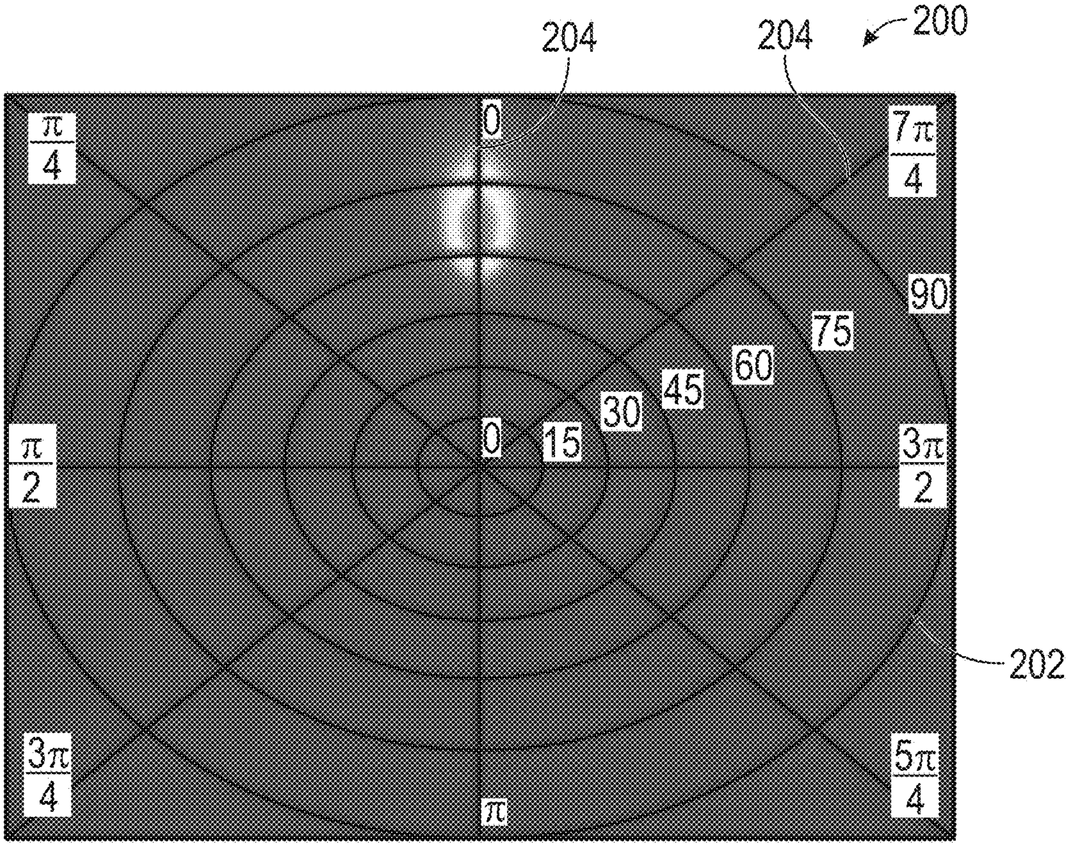
FIG. 2 is a graphical illustration of a measurement of a reflected light beam at a given circumferential position and angle of incidence of an input light beam for measuring the BRDF

FIG. 2 is a graphical representation 200 that is specular (e.g. mirror) and provides a measurement of a reflected light beam RLB at a given corresponding circumferential position and angle of incidence of the input light beams ILB reflecting off the ellipsoidal mirror 52. The rings 202 in the graphical representation 200 represent angles of incidence of the reflected light beams RLB from zero to ninety degrees and the radial lines 204 represent a circumferential position of the reflected light beams RLB reflecting off the ellipsoidal mirror 52. In the illustrated example, the circumferential position is in units of radians, but other units can be used to identify the circumferential position of the input light beams ILB with the ellipsoidal mirror 52.

Figure 3:
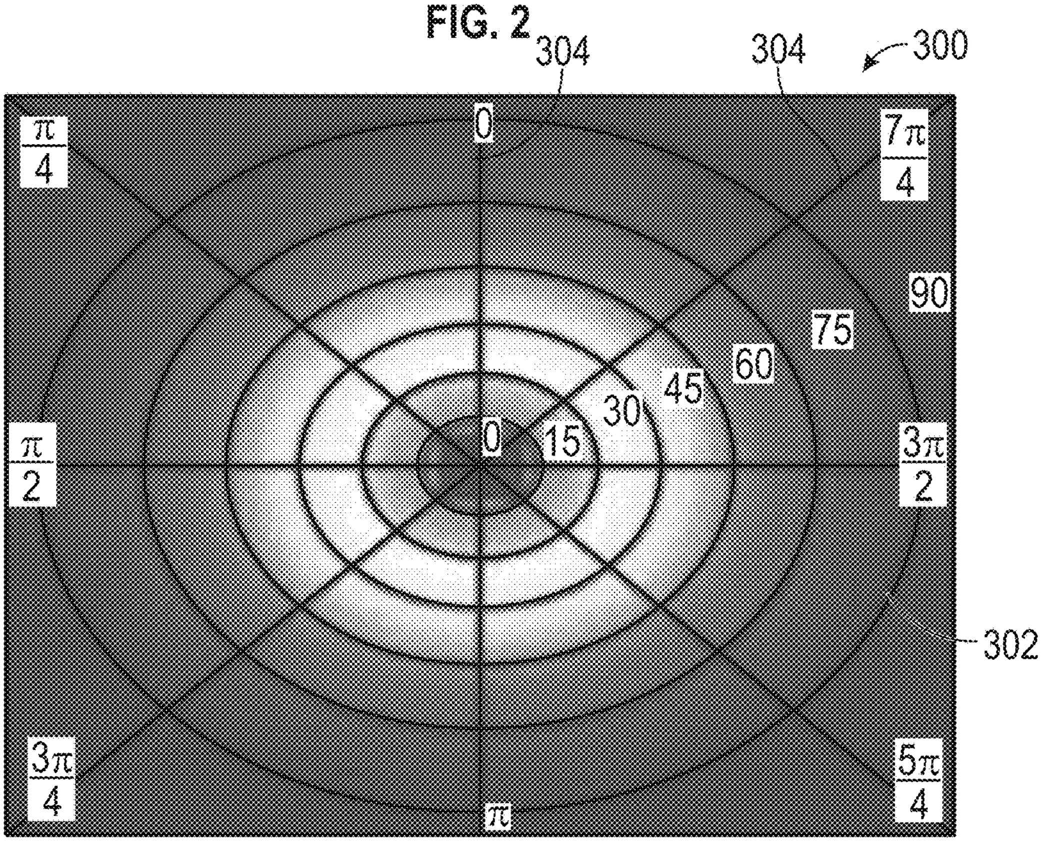
FIG. 3 is a graphical illustration of a reflection intensity at the given location of FIG. 2.

The lighter region of FIG. 2 is illustrative of the reflected light beams RLB being located around approximately zero radians and 65 degrees. As the sample 22 under test obeys the law of reflection where the angle input equals the angle output, the input light beams ILB contacted the sample 22 under test at approximately 65 degrees incidence at a clocking angle of FIG. 3 is a graphical representation 300 of an intensity of the reflected light beams RLB off the sample 22 with the sample 22 being diffuse/lambertian. These kinds of materials reflect light into a hemisphere in a diffuse nature with the lighter color indicating a high intensity. The rings 302 in the graphical representation 300 represent angles of incidence of the reflected light beams RLB from zero to ninety degrees and the radial lines 304 represent a circumferential position of the reflected light beams RLB reflecting off the ellipsoidal mirror 52. The square dark zone in the center is the region blocked by the sample 22. Measurements for this region are obtained utilizing the second detector 66.

As shown in FIG. 1, the sample 22 is specular with the reflected light beams RLB reflecting off the sample 22 at the same angle as the input light beams ILB. In the case of the sample 22 being diffuse as shown in FIG. 3, the reflected light beams RLB would be distributed at all points along the ellipsoidal mirror 52. Based on the graphical representation 300, a higher intensity is measured at lower angles (near the optical axis O in FIG. 1) and the intensity will decrease towards higher angles of incidence.

Figure 4:
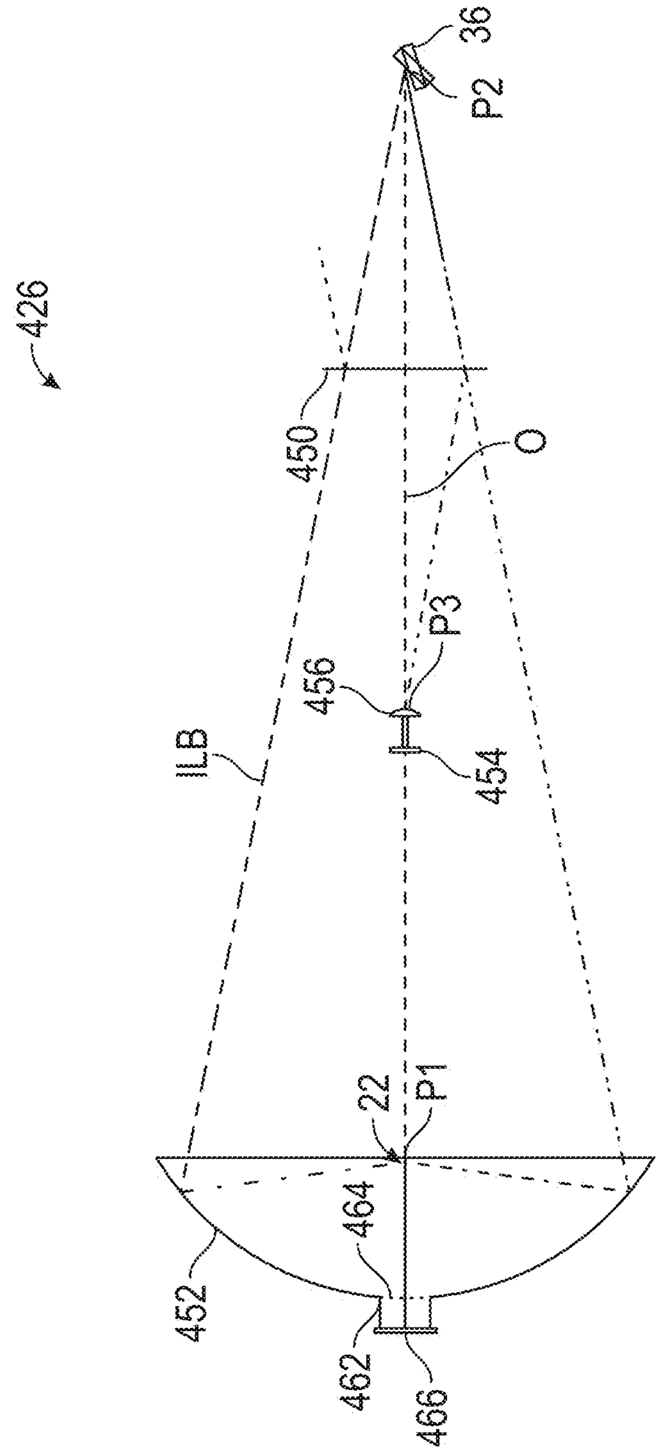
FIG. 4 is a schematic illustration of another example detection portion for use with the generation portion of FIG. 1.

FIG. 4 illustrates another example detection portion 426. The detection portion 426 is similar to the detection portion 26 except where shown in the drawings or discussed below. The same or like components between the detection portion 26 and the detection portion 426 will include the addition of a leading "4". As shown in FIG. 4, the detection portion 426 receives the light beams from the generation portion 24. The light beams are directed into the detection portion 426 with the two-axis mirror 36. One feature of an ellipsoidal mirror 452 in the detection portion 426 is that it includes a first focal point P1 at the location of the sample 22 and a second focal point P2 at the location of the two-axis mirror 36 with a third focal point P3 created between the first and second focal points as described above.

As the detection portion 426 receives light beams from the two-axis mirror 36, a portion of the light beams pass through a beam splitter 450. The portion of the light beams passing through the beam splitter 450 become input light beams ILB and travel to the ellipsoidal mirror 452 with the sample 22 at the first focal point P1 of the ellipsoidal mirror 452. The input light beams reflect off the sample 22 and become reflected light beams RLB that are later received by a detector 454 for measuring BRDF.

In the illustrated example, the reflected light beams RLB reflect off an opposite side of the ellipsoidal mirror 452 from the input light beams ILB. As the reflected light beams RLB leave the ellipsoidal mirror 452 they are directed back through the beam splitter 450. A first portion of the reflected light beams RLB pass through the beam splitter 450 and a second portion of the reflected light beams RLB reflect off the beam splitter 450.

The second portion of the reflected light beams RLB then pass through the third focal point P3. In the illustrated example, the third focal point P3 is located at an intersection of the reflected light beams RLB and an optical axis O. In the illustrated example, a lens 456 is located one focal length from the focal point P3. The lens 456 directs the light to the detector 454. In the illustrated example the detector 454 is located on the optical axis O and in a region where the reflected light beams RLB are blocked by the sample 22.

A second detector 466 can capture the measurements for the BRDF that would otherwise be blocked from the detector 454 by the sample 22. In the illustrated example, the second detector 466 is located on an opposite side of the ellipsoidal mirror 452 from the sample 22. The second detector 466 is also aligned with an opening 462 in the ellipsoidal mirror 452 and positioned along the optical axis O. A collimating lens 464 is located along the optical axis O for collecting the reflected light beams RLB and directing them into the second detector 466.

Figure 5:
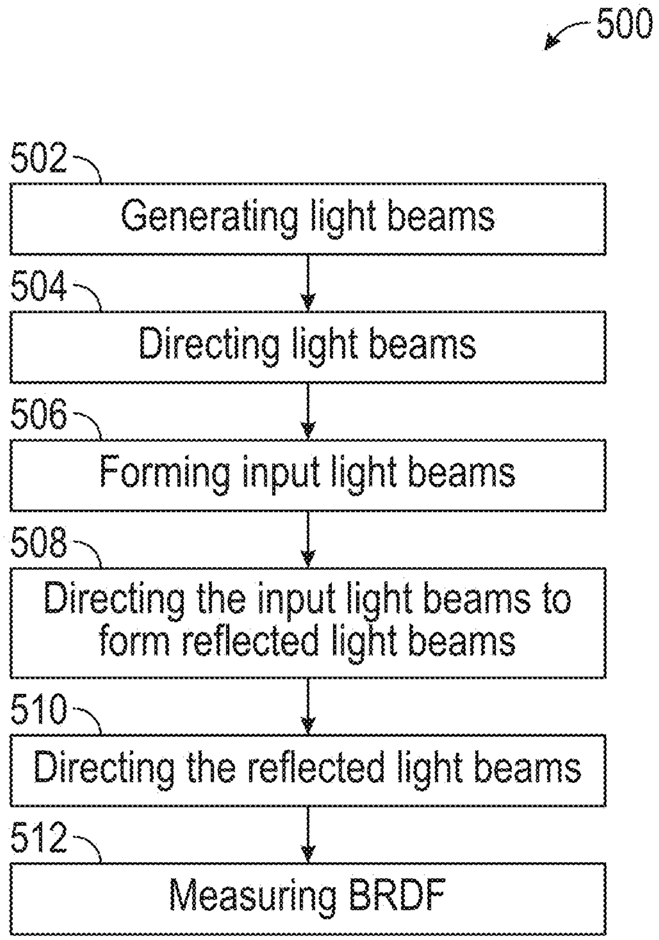
FIG. 5 is a flow diagram of an example method of measuring BRDF with the system of FIG. 1.

FIG. 5 illustrates a method 500 of operating the system 20 with either of the detection portions 26 or 426. The method 500 begins at block 502 ("Generate Light Beams"). At block 502 of the method 500, the controller 48 directs one of the first or second lasers 28-1 or 28-2 to generate a light beam having predetermined characteristics. One the light beams are generated, the method 500 proceeds to Block 504.

At block 504 ("Direct the Light Beams"), the method 500 directs the generated light beams with the series of reflectors to the two-axis mirror 36 of the generation portion 24. Once the light beams reach the two-axis mirror 36, the two-axis mirror 36 directs the light beams through the beam splitter 50 or 450 and into the ellipsoidal mirror 52 or 452 at the plurality of predetermined locations. One feature of this arrangement is to locate the sample and the two-axis mirror 36 at separate focal points and utilize the beam splitter 50 or 450 to generate a third focal point P3 to pass the reflect light beams. As the light beams are directed, the method 500 proceeds to block 506.

At block 506 ("Collect Reflected Light Beams to Measure BRDF"), the method 500 collects the reflected light beams RLB for each of the plurality of locations that the light beams are directed into the ellipsoidal mirror 52 or 452. The reflected light beams RLB are collected with one of the detectors 54, 66, 454, or 466. The controller 48 then receives input signals from at least one of the detectors 54, 66, 454, or 466 for measuring BRDF and generating the corresponding graphical representations 200 and 300 for each location on the ellipsoidal mirror 52 or 452 that the two-axis mirror 36 directed the light beams.

The following Clauses provide example configurations of the system 20 and method 500 as shown in the FIGS.

Clause 1. A system for measuring a bidirectional reflectance distribution function, the system comprising: a light source configured to generate light beams; a series of reflective elements configured to direct the light beams; a two-axis mirror configured to direct the light beams from the series of reflective elements; a beam splitter configured to receive the light beams from the two-axis mirror and allow a first portion of the light beams to pass through the beam splitter; an ellipsoidal mirror configured to receive the first portion of light beams from the beam splitter at a plurality of predetermined locations on the ellipsoidal mirror as directed by the two-axis mirror with the two-axis mirror being located at a second focal point of the ellipsoidal mirror and the ellipsoidal mirror is configured to direct the first portion of light beams through a first focal point of the ellipsoidal mirror to reflect off a sample at the first focal point to generate reflected light beams, wherein the reflected light beams are directed from the ellipsoidal mirror to the beam splitter with a portion of the reflected light beams configured to reflect off the beam splitter and pass through a third focal point; and a first detector configured to receive the reflected light beams from the third focal point for each of the plurality of predetermined locations for measuring the bidirectional reflectance distribution function.

Clause 2. The system of clause 1, wherein a location of the light source is fixed relative to a location of the first detector when the two-axis mirror directs the light beams to each of the plurality of predetermined locations on the ellipsoidal mirror.

Clause 3: The system of clauses 1-2, wherein the first focal point of the ellipsoidal mirror and the second focal point are located along an optical axis of the ellipsoidal mirror.

Clause 4: The system of clauses 1-3, wherein the first detector is located along an optical axis of the ellipsoidal mirror.

Clause 5: The system of clauses 1-4, including a lens located one focal length away from the third focal point aligned along the optical axis of the ellipsoidal mirror.

Clause 6: The system of clauses 1-5, including a reflector located along the optical axis for directing the reflected light beams from the lens in a direction transverse to the optical axis.

Clause 7: The system of clauses 1-6, including a second lens configured to receive the reflected light beams from the reflected and direct them to the first detector.

Clause 8: The system of clauses 1-7, including a second detector located on an opposite side of the ellipsoidal mirror from the first focal point of the ellipsoidal mirror.

Clause 9: The system of clauses 1-8, including a collimating lens located between the first focal point of the ellipsoidal mirror and the second detector.

Clause 10: The system of clauses 1-9, wherein the first detector is a spatially resolved detector.

Clause 11: The system of clauses 1-10, wherein the series of reflective elements include a galvanometer for selectively directing the light beams through one of a first polarizer or a second polarizer.

Clause 12: A method of measuring a bidirectional reflectance distribution function, the method comprising: generating light beams with a light source; directing the light beams from light source with a series of reflectors to a two-axis mirror, wherein the two-axis mirror directs the light beams to a plurality of predetermined locations on an ellipsoidal mirror and the light beams reflect off a sample located at a first focal point of the ellipsoidal mirror to generate reflected light beams with the two-axis mirror; and collecting the reflected light beams corresponding to each of the plurality of predetermined locations on the ellipsoidal mirror with a first detector, wherein a portion of the reflected light beams reflect off a beam splitter and pass through a third focal point prior to reaching the first detector for measuring a bidirectional reflectance distribution function.

Clause 13: The method of clause 12, wherein the reflected light beams pass through a lens at the third focal point, wherein the lens is aligned along an optical axis of the ellipsoidal mirror.

Clause 14: The method of clauses 12-13, including directing the light beams from the lens at the third focal point in a direction transverse to the optical axis of with a reflector to the first detector.

Clause 15: The method of clauses 12-14, wherein the series of reflective elements include a galvanometer for selectively directing the light beams through one of a first polarizer or a second polarizer.

Clause 16: The method of clauses 12-15, including collecting the reflected light beams with a second detector when an angle of incidence between the light beams and the ellipsoidal mirror is below a predetermined threshold angle.

Clause 17: The method of clauses 12-16, wherein the second detector is aligned with an opening in the ellipsoidal mirror and the second detector is located on an opposite side of the ellipsoidal mirror from the first focal point of the ellipsoidal mirror.

Clause 18: The method of clauses 12-17, wherein the reflected light beams pass through a collimating lens located between the first focal point of the ellipsoidal mirror and the second detector.

Clause 19: A non-transitory computer-readable storage medium embodying programmed instructions which, when executed by a processor, are operable for performing a method comprising: generating light beams with a light source; directing the light beams from light source with a series of reflectors to a two-axis mirror, wherein the two-axis mirror directs the light beams to a plurality of predetermined locations on an ellipsoidal mirror and the light beams reflect off a sample located at a first focal point of the ellipsoidal mirror to generate reflected light beams with the two-axis mirror; and collecting the reflected light beams corresponding to each of the plurality of predetermined locations on the ellipsoidal mirror with a detector, wherein a portion of the reflected light beams reflect off a beam splitter and pass through a third focal point prior to reaching the detector for measuring a bidirectional reflectance distribution function.

Clause 20: The non-transitory computer-readable storage medium of clause 19, including collecting the reflected light beams with a second detector when an angle of incidence between the light beams and the ellipsoidal mirror is below a predetermined threshold angle.

The terms “comprising”, “including”, and “having” are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term “or” includes any combinations of the associated listed items. The term “any of” is understood to include any possible combination of referenced items, including “any one of” the referenced items. The term “any of” is understood to include any possible combination of referenced claims of the appended claims, including “any one of” the referenced claims.

For consistency and convenience, directional adjectives may be employed throughout this detailed description corresponding to the illustrated embodiments. Those having ordinary skill in the art will recognize that terms such as “above”, “below”, “upward”, “downward”, “top”, “bottom”, etc., may be used descriptively relative to the figures, without representing limitations on the scope of the invention, as defined by the claims.

What is claimed is:

1. A system for measuring a bidirectional reflectance distribution function, the system comprising:

a light source configured to generate light beams;

a series of reflective elements configured to direct the light beams;

a two-axis mirror configured to direct the light beams from the series of reflective elements;

a beam splitter configured to receive the light beams from the two-axis mirror and allow a first portion of the light beams to pass through the beam splitter;

an ellipsoidal mirror configured to receive the first portion of light beams from the beam splitter at a plurality of predetermined locations on the ellipsoidal mirror as directed by the two-axis mirror with the two-axis mirror being located at a second focal point of the ellipsoidal mirror and the ellipsoidal mirror is configured to direct the first portion of light beams through a first focal point of the ellipsoidal mirror to reflect off a sample at the first focal point to generate reflected light beams, wherein the reflected light beams are directed from the ellipsoidal mirror to the beam splitter with a portion of the reflected light beams configured to reflect off the beam splitter and pass through a third focal point located along an optical axis between the first focal point and the second focal point; and a first detector configured to receive the reflected light beams from the third focal point for each of the plurality of predetermined locations for measuring the bidirectional reflectance distribution function.

2. The system of claim 1, wherein a location of the light source is fixed relative to a location of the first detector when the two-axis mirror directs the light beams to each of the plurality of predetermined locations on the ellipsoidal mirror.

3. The system of claim 1, wherein the first focal point of the ellipsoidal mirror and the second focal point are located along an optical axis of the ellipsoidal mirror.

4. The system of claim 3, wherein the first detector is located along the optical axis of the ellipsoidal mirror.

5. The system of claim 4, including a lens located one focal length away from the third focal point aligned along the optical axis of the ellipsoidal mirror.

6. The system of claim 5, including a reflector located along the optical axis for directing the reflected light beams from the lens in a direction transverse to the optical axis.

7. The system of claim 6, including a second lens configured to receive the reflected light beams from the reflected and direct them to the first detector.

8. The system of claim 1, including a second detector located on an opposite side of the ellipsoidal mirror from the first focal point of the ellipsoidal mirror.

9. The system of claim 8, including a collimating lens located between the first focal point of the ellipsoidal mirror and the second detector.

10. The system of claim 1, wherein the first detector is a spatially resolved detector.

11. The system of claim 1, wherein the series of reflective elements include a galvanometer for selectively directing the light beams through one of a first polarizer or a second polarizer.

12. A method of measuring a bidirectional reflectance distribution function, the method comprising:

generating light beams with a light source;

directing the light beams from light source with a series of reflectors to a two-axis mirror located at a second focal point, wherein the two-axis mirror directs the light beams to a plurality of predetermined locations on an ellipsoidal mirror and the light beams reflect off a sample located at a first focal point of the ellipsoidal mirror to generate reflected light beams with the two-axis mirror; and collecting the reflected light beams corresponding to each of the plurality of predetermined locations on the ellipsoidal mirror with a first detector, wherein a portion of the reflected light beams reflect off a beam splitter and pass through a third focal point located along an optical axis between the first focal point and the second focal point prior to reaching the first detector for measuring the bidirectional reflectance distribution function.

13. The method of claim 12, wherein the reflected light beams pass through a lens at the third focal point, wherein the lens is aligned along an optical axis of the ellipsoidal mirror.

14. The method of claim 13, including directing the light beams from the lens at the third focal point in a direction transverse to the optical axis of with a reflector to the first detector.

15. The method of claim 12, wherein the series of reflective elements include a galvanometer for selectively directing the light beams through one of a first polarizer or a second polarizer.

16. The method of claim 12, including collecting the reflected light beams with a second detector when an angle of incidence between the light beams and the ellipsoidal mirror is below a predetermined threshold angle.

17. The method of claim 16, wherein the second detector is aligned with an opening in the ellipsoidal mirror and the second detector is located on an opposite side of the ellipsoidal mirror from the first focal point of the ellipsoidal mirror.

18. The method of claim 17, wherein the reflected light beams pass through a collimating lens located between the first focal point of the ellipsoidal mirror and the second detector.

19. A non-transitory computer-readable storage medium embodying programmed instructions which, when executed by a processor, are operable for performing a method comprising:

generating light beams with a light source;

directing the light beams from light source with a series of reflectors to a two-axis mirror located at a second focal point, wherein the two-axis mirror directs the light beams to a plurality of predetermined locations on an ellipsoidal mirror and the light beams reflect off a sample located at a first focal point of the ellipsoidal mirror to generate reflected light beams with the two-axis mirror; and collecting the reflected light beams corresponding to each of the plurality of predetermined locations on the ellipsoidal mirror with a detector, wherein a portion of the reflected light beams reflect off a beam splitter and pass through a third focal point located along an optical axis between the first focal point and the second focal point prior to reaching the detector for measuring a bidirectional reflectance distribution function.

20. The non-transitory computer-readable storage medium of claim 19, including collecting the reflected light beams with a second detector when an angle of incidence between the light beams and the ellipsoidal mirror is below a predetermined threshold angle.

* * * * *